Aug. 24, 1937.  H. F. LA RUE  2,090,686
CLUTCH MECHANISM FOR IRONERS
Filed May 12, 1936  2 Sheets-Sheet 1

Inventor:
HARRY F. LA RUE.
By E. E. Vrooman & Co.,
His Attorneys.

Aug. 24, 1937.     H. F. LA RUE     2,090,686
CLUTCH MECHANISM FOR IRONERS
Filed May 12, 1936     2 Sheets-Sheet 2

Inventor:
HARRY F. LA RUE.
By E. E. Vrooman & Co.,
His Attorneys.

Patented Aug. 24, 1937

2,090,686

UNITED STATES PATENT OFFICE 2,090,686

CLUTCH MECHANISM FOR IRONERS

Harry F. La Rue, Fairfield, Iowa

Application May 12, 1936, Serial No. 79,334

3 Claims. (Cl. 192—25)

This invention relates to a clutch mechanism for ironers.

An object of the invention is the provision of simple and efficient clutch means for operating the gearing of an ironer, for placing the same in an operative or inoperative condition.

Another object of the invention is the provision of simple and efficient clutch means, easily manipulated by the operator, for controlling the movement of the ironing shoe.

A further object of the invention is the provision of simple and efficient clutch means actuated by the hand or limb of the operator for placing the gearing mechanism in an operative or inoperative position.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 4 is a sectional view taken on line 4—4, Figure 1, and looking in the direction of the arrows.

Figure 5 is a sectional view taken on line 5—5, Figure 2, and looking in the direction of the arrows.

Figure 1:
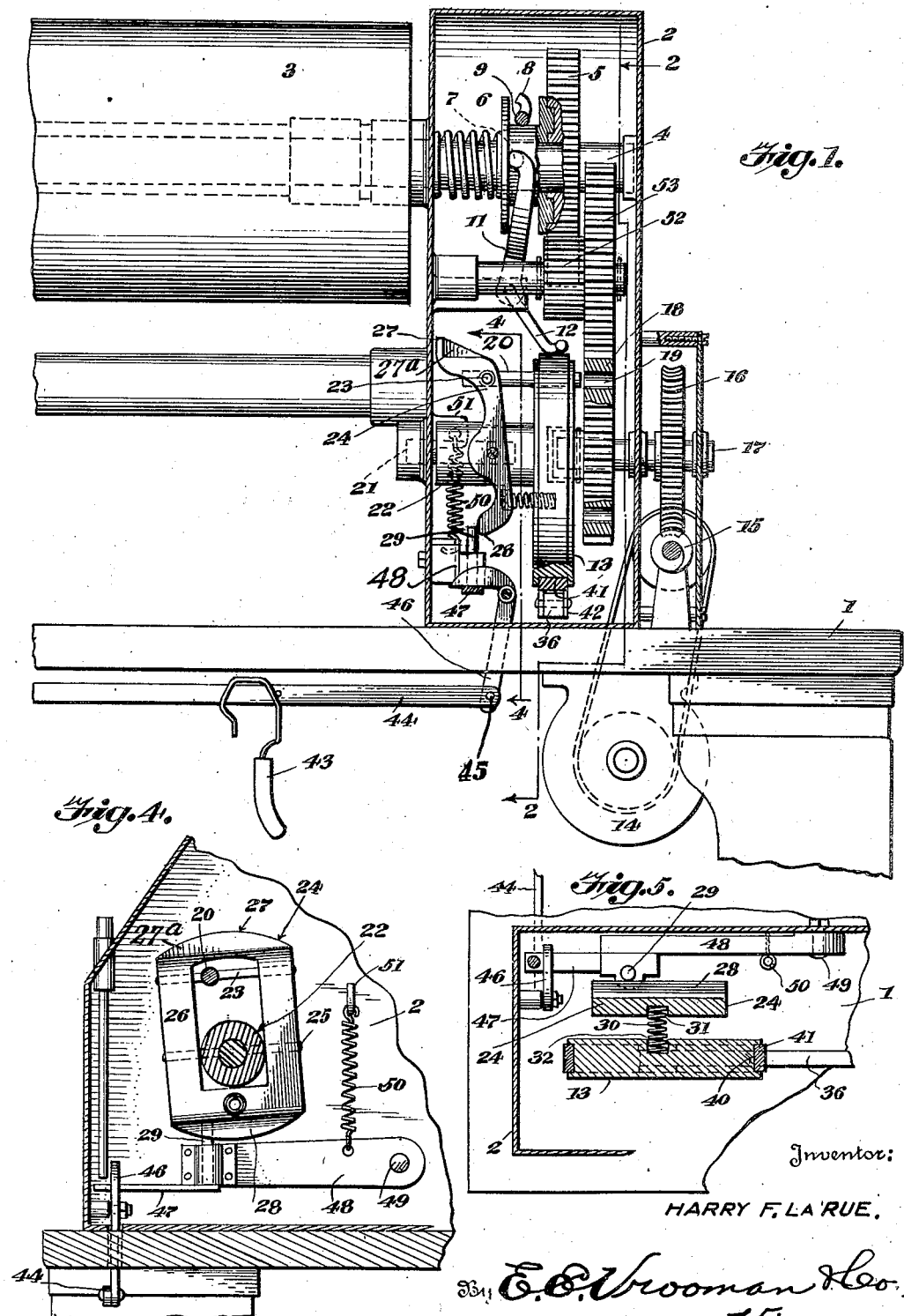
Figure 1 is a view in front elevation of a gearing including a clutch mechanism constructed in accordance with the present invention.

Referring to the drawings by numerals, 1 designates a frame or support of any desired construction, on which is suitably mounted a gear casing 2. An ironing roller 3 is provided with a shaft 4, which shaft extends into the gear casing 2 (Fig. 1). A gear 5 is loosely mounted on shaft 4, within gear casing 2, and on shaft 4 is positioned a spring-pressed clutch member 6. A pin 7, shown by dotted line in Fig. 1, is mounted in a suitable slot, not shown, in shaft 4, and said pin 7 slidably retains clutch member 6 so that said clutch member revolves with shaft 4.

A horizontal manually operated lever 8 is mounted on gear casing 2. The inner hook-like end 9 of lever 8 engages the clutch member 6, with its outer grip end 10 in position to be engaged by the operator. Therefore, it will be seen that if the operator desires he can move clutch member 6 from its meshing position (Fig. 1) with idle gear 5, whereby rotation of roller 3 can be stopped. A clutch yoke 11 straddles at its upper end the clutch member 6, with its angular downwardly-extending leg 12 in position to be operated by the eccentric 13, for disengaging clutch member 6 from gear 5, as will be hereinafter described.

Figure 3:
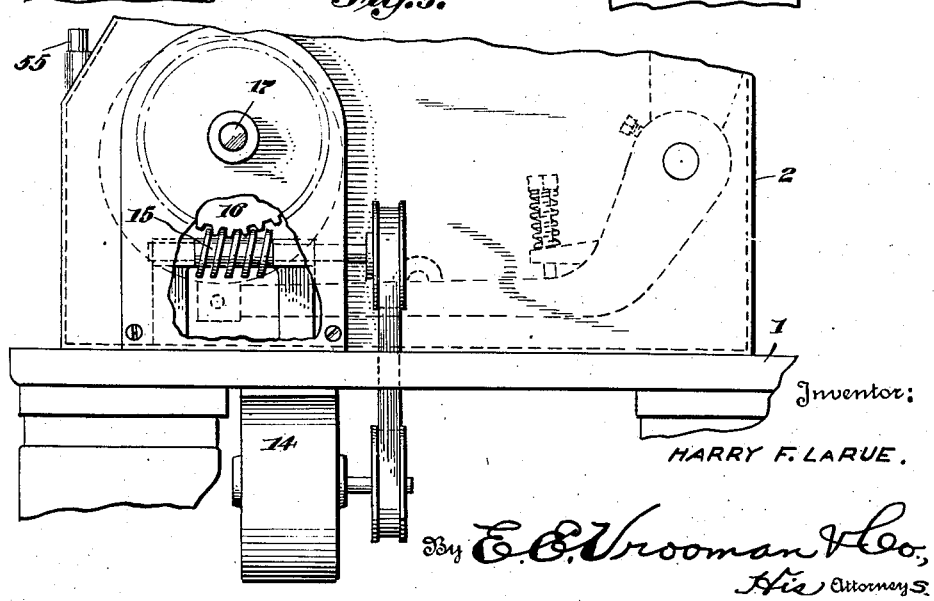
Figure 3 is a fragmentary side view of an ironer, showing particularly the position of the motor and the driving means for the gearing.

A suitable motor 14 is mounted on the frame 1 (Fig. 3) and is operably connected to the horizontal worm 15, which worm meshes with the worm gear 16. Worm gear 16 is mounted on horizontal shaft 17 carried by the gear casing 2. A drive pinion 18 is fixedly secured to shaft 17 within the gear casing 2. This drive pinion is provided with a plurality of pin-receiving apertures 19, any one of which is adapted to receive sliding locking pin 20.

A shaft 21 (Fig. 1) is suitably supported upon the inner side of gear casing 2 and extends into the idle sleeve 22. Fixedly secured to the outer end of sleeve 22 is the eccentric 13. The locking pin 20 is positioned in eccentric 13 and extends beyond its outer face as clearly seen in Figure 1, ready to enter one of the apertures 19. The sliding locking pin 20 is fastened upon a supporting pin 23 which pin 23 is rotatably mounted on the upper portion of the rectangular control yoke 24 (Fig. 4). This control yoke 24 is fastened on sleeve 22 by means of pin 25. The yoke 24 is provided with a straight outer face 26 while its ends are of an irregular or double curved structure as clearly seen in Figure 1. At one of the extreme ends of the yoke 24 there is an integral outwardly extending curved lip 27, constituting a cam, by reason of its curved surface 27a while the other end of yoke 24 terminates in an outwardly extending curved finger 28, constituting a cam. This finger 28 is shown engaging the right side of control bar pin 29; the curved surface 27a of lip 27 engages the left side of pin 29. A coil spring 30 has one end seated in socket 31 of yoke 24 and its other end is seated in socket 32 formed in eccentric 13 (Fig. 5). This spring 30, therefore, normally holds finger 28 in contact with the pin 29.

Figure 2:
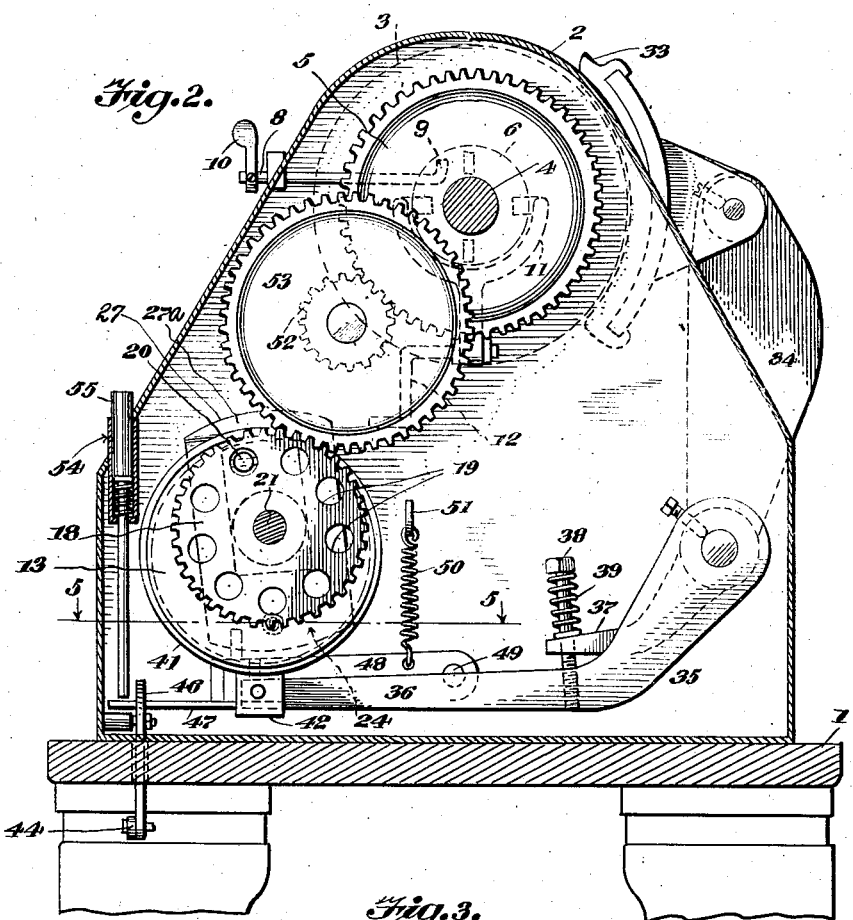
Figure 2 is a sectional view, taken on line 2—2, Figure 1, and looking in the direction of the arrows.

An ironing shoe 33 is carried by the upper section 34 of the eccentric pressure arm 35. The lower section 36 (Fig. 2) of pressure arm 35 extends under the eccentric 13. The upper section 34 is provided with a foot portion 37, which has a bolt 38 extending therethrough; said bolt 38 is threaded into the lower section 36. A coil spring 39 is mounted on bolt 38 between foot 37 and the head of the bolt. This affords a suitable yielding or cushioning action of the shoe 33 against the ironing roller 3.

The eccentric 13 is grooved at 40, in which groove is slidably mounted a steel band 41. This band 41 has a clevis 42 secured thereto; this clevis is mounted on the inner end of section 36 of the pressure arm 35.

A knee engaging unit 43 (Fig. 1) is suitably mounted on knee control bar 44 and bar 44 is pivotally connected at 45 to the lower end of inverted L-shaped trip 46. The upper end of trip 46 overhangs the horizontal arm 47 which arm 47 is secured to pin 29 and control bar 48 (Fig. 4). The control bar 48 is pivotally mounted at 49 in any suitable manner upon the gear casing 2. A coil spring 50 has one end secured to bar 48 and its other end secured to lug 51 of the gear casing 2. Therefore it will be seen that when the operator presses on knee unit 43 bar 44 will be moved to the right, whereby control bar 48 will be pulled down, against the action of spring 50, causing the pin 29 to move down and clear finger 28 of the yoke 24, resulting in spring 30 pivoting the lower end of yoke 24 to the left, whereupon pin 20 will move into one of the apertures 19, of drive pinion 18, causing the eccentric to move one-half turn. This movement will raise the outer end of the eccentric pressure arm section 36, and shoe 33 will consequently move away from ironing roller 3. At the same time the eccentric will operate leg 12 of clutch yoke 11, disengaging clutch member 6 from gear 5 and thereby stop rotation of ironing roller 3.

Gear 5 meshes with small pinion 52, which pinion constitutes a part of gear 53. Gear 53 meshes with drive pinion 18 so that when the motor is operating the train of gears are operated. However when clutch member 6 is not meshing with gear 5 roller 3 will not be operated, nor will the eccentric 13 and yoke 24 be operated when locking pin 20 is not "meshing" with one of the apertures 19 of drive pinion 18.

A finger control 54 is provided, comprising a spring-pressed plunger 55, the lower end of which engages arm 47 to move the outer end of control bar 48 downward, performing the same function as described in connection with the action of the knee control 43 and 44.

In operation, when the control bar 48 is pushed down the control yoke 24 is released, and pin 20 will enter one of the apertures 19 of the drive pinion 18, causing the eccentric 13 to make one-half turn, or until the opposite end of the control yoke comes in contact with the control bar pin 29 which pulls the drive pin side of the yoke 24 to the left and disengages locking pin 20 from drive pinion 18. As soon as pin 20 disengages from drive pinion 18 the eccentric will stop. One-half turn of the control yoke 24 brings the eccentric "up"; the other half turn brings it to a "down" position; either of these two positions being arrived at by depressing the finger control 54 or moving the knee control, as hereinbefore described. When the eccentric 13 moves into the "down" position it pushes pressure arm section 36 down and then holds it there, thus bringing the shoe 33 to the roller 3 and holding it with pressure for ironing. While the eccentric 13 remains in its "down" position, clutch yoke or fork 11 hangs free and allows the clutch spring of the clutch member 6 to force the clutch member into meshing position, whereby the roller 3 is rotated. When the eccentric 13 moves into the "up" position, it raises pressure arm section 36 and throws ironing shoe 33 back from roller 3, and at the same time the eccentric 13 strikes the angular leg 12 of the clutch lever or yoke 11, which disengages clutch member 6 and thereby stops rotation of ironing roller 3; when such condition is reached the gears run idle.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a mechanism of the class described, the combination with a drive pinion, a driven member at one side of said drive pinion, of a control yoke movably mounted at the side of said driven member, said control yoke provided at each end with a cam surface, said surfaces being on opposite faces of said control yoke, a locking pin slidably extending through said driven member and being adapted to engage said drive pinion, means pivotally connecting said locking pin to said control yoke between its center and one end, and manually-controlled locking means for alternately engaging said cam surfaces for temporarily holding said control yoke and its locking pin in an inoperative position.

2. In a mechanism of the class described, the combination with a drive pinion, a driven member at one side of said drive pinion, of a control yoke movably mounted at one side of said driven member, said yoke provided at its ends with oppositely facing cam surfaces, connecting means extending through said driven member and pivotally fastened to said yoke between said cam surfaces, and being adapted to be driven by said drive pinion, and a manually-controlled pin alternately contacting the cam surfaces of said yoke, whereby said yoke and its connecting means is held in an inoperative position with respect to said drive pinion.

3. In a mechanism of the class described, the combination of a drive pinion provided with a plurality of pin-receiving apertures, a sleeve provided with a driven member at one side of said drive pinion, a control yoke straddling said sleeve and being pivotally mounted thereon, said control yoke provided at its ends with oppositely facing cam surfaces, a spring between said control yoke and said driven member and exerting pressure upon one end of said control yoke, a supporting-pin pivotally mounted at its inner end on the sides of said control yoke, a locking-pin extending through said driven member and secured at its inner end upon said supporting-pin, said locking pin being normally urged by said spring into a pin-receiving aperture of the drive pinion, a control bar contiguous to said control yoke, said control bar provided with an upstanding-pin, said upstanding-pin adapted to be engaged alternately on its right side by one cam surface and on its left side by the other cam surface, whereby said locking-pin is withdrawn from said drive pinion, and manually-operated means connected to said control bar to withdraw the upstanding-pin from the engaged cam surface.

HARRY F. LA RUE.